Feb. 14, 1967 P. F. K. ERBGUTH 3,303,610
FLOWER HOLDER
Filed July 6, 1964 2 Sheets-Sheet 1

PAUL F. K. ERBGUTH
INVENTOR.

BY Rudolph J. Finch
ATTORNEY

PAUL F. K. ERBGUTH
INVENTOR.

United States Patent Office 3,303,610
Patented Feb. 14, 1967

3,303,610
FLOWER HOLDER
Paul F. K. Erbguth, 120 Station Road,
Great Neck, N.Y. 11023
Filed July 6, 1964, Ser. No. 380,223
11 Claims. (Cl. 47—41.11)

This invention relates to a holder for flowers and more particularly to a device of this class constructed and arranged to serve as a candle holder or, alternatively, to encircle a candle supported by a conventional candle holder.

An object of this invention is the provision of an improved flower holder for use in combination with a candle.

An object of this invention is the provision of a generally circular flower holder having a central opening extending therethrough and including a chamber for containing water.

An object of this invention is the provision of a circular flower holder comprising a case for containing water, means forming axially-spaced apertures for retaining flowers in a generally upright position and means for accommodating a candle.

An object of this invention is the provision of a circular flower holder adapted to encircle a candle, said holder comprising a case for holding water, an insert member having means for supporting a plurality of flowers in generally vertical position, said insert member being supported in axially-spaced position from an open end of the case by circumferentially-spaced posts.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

Figure 1:
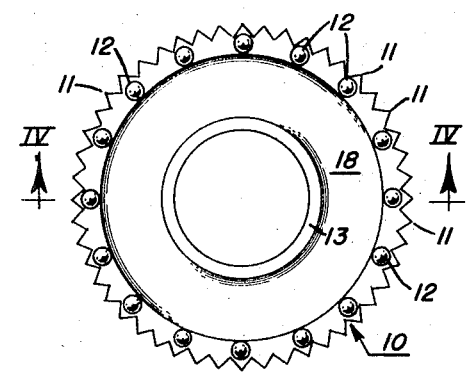
FIGURE 1 is a top plan view of the case which comprises one component of a flower holder made in accordance with this invention.

Reference now is made to FIGURES 1–4 wherein the case, or container, of a flower holder made in accordance with this invention is identified by the numeral 10. Such container is molded of a suitable plastic. However, I prefer to make the entire flower holder of a clear plastic material, since the configuration of various surface portions thereof (as will be described hereinbelow) is such that a clear plastic device presents the general appearance of cut glass. The entire outer wall of the case 10 is provided with parallel V-shaped grooves resulting in the pointed flutes 11. Formed integrally with the case are a plurality of upwardly-directed, circumferentially-spaced pins 12. A central tubular portion 13 extends somewhat above the ends of the pins 12 and defines a circular opening 14 in the bottom wall 15. As shown in the cross-sectional view of FIGURE 4, the inner wall of the tubular portion 13 includes a tapered upper section 16 communicating with a reversely-tapered lower section 17. The space between the tubular member and the inner wall of the case comprises a circular chamber 18 for holding water. A portion of the bottom wall of the case is recessed to form a circular base portion 19.

Figure 5:
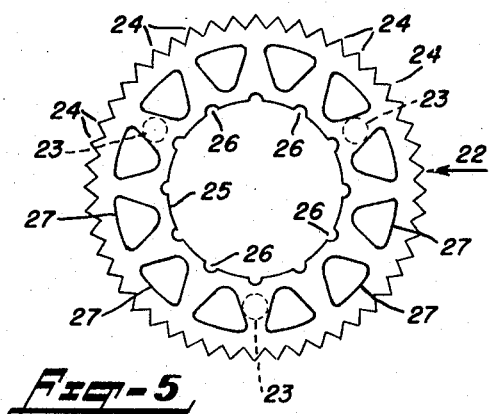
FIGURE 5 is a top plan view of the insert member.
Figure 2:
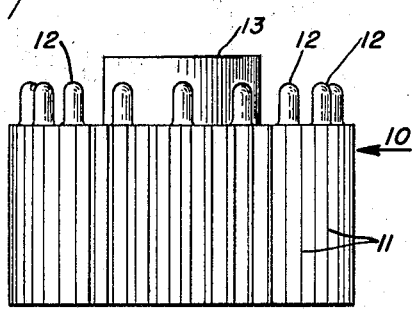
FIGURE 2 is a side view thereof.
Figure 6:
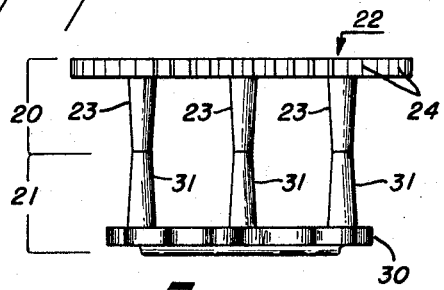
FIGURE 6 is a side view thereof.
Figure 3:
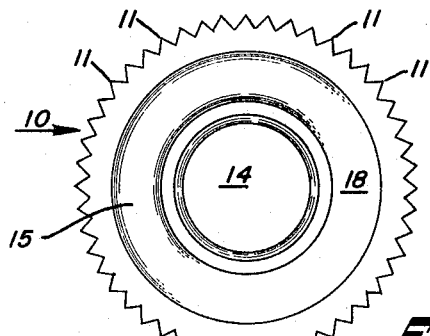
FIGURE 3 is a bottom view thereof.
Figure 7:
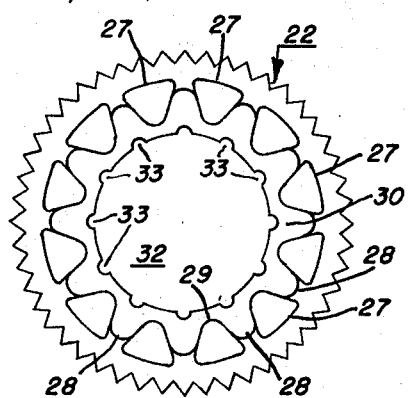
FIGURE 7 is a bottom view thereof.

The insert member for completing the flower holder is shown in FIGURES 5–7, said member comprising two pieces identified by the numerals 20 and 21 and molded of a suitable plastic. Preferably, the insert member also is molded of a clear plastic. The upper insert piece comprises a circular plate 22 having integral posts 23, said posts being spaced apart approximately 120 degrees. The peripheral surface of the plate is provided with parallel, V-shaped grooves resulting in the pointed flutes 24, whereby such surface has a configuration generally corresponding to the outer surface of the case.

A central opening 25, formed in the plate, has a diameter slightly larger than the outside diameter of the tubular portion 13, of the case (see also FIGURE 2), and the wall defining such central opening includes a plurality of axially-extending, spaced grooves 26. Also, the plate 22 is provided with a plurality of circumferentially-spaced openings 27, which openings will overlie the circular chamber 18 of the case when the insert member is assembled to the case.

The lower piece 21, of the insert member, comprises a generally circular plate 30 provided with integral posts 31 corresponding to the similar posts 23 of the upper insert pieces. Corresponding sets of the posts 23 and 31 are cemented together to form the unitary insert member. As best shown in the bottom view of FIGURE 7, the plate 30 has an undulating peripheral surface formed of the spaced, tooth-like portions 28 corresponding in number to the openings 27 formed in the upper plate 22 of the insert piece. It will be noted that the troughs 29, formed between adjacent tooth-like portions 28, are axially aligned with the openings 27. The plate 30 is provided with a central hole 32 and the wall defining such hole includes the axially-extending grooves 33, which grooves are in axial alignment with the similar grooves 26 formed in the upper plate 22. It may here be pointed out that the outside diameter of the upper plate 22 is substantially equal to the outside diameter of the case whereas the outside diameter of the lower plate 30 is somewhat less than the inside diameter of the case.

Figure 8:
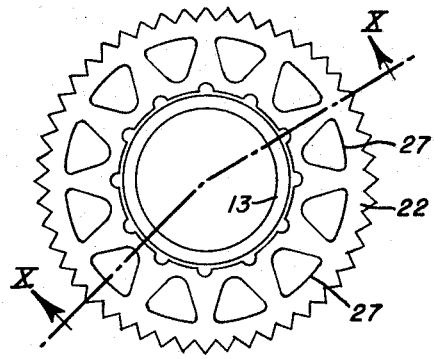
FIGURE 8 is a top plan view of the assembled flower holder.
Figure 9:
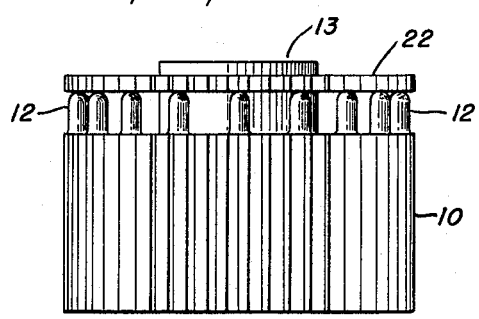
FIGURE 9 is a side view thereof.
Figure 10:
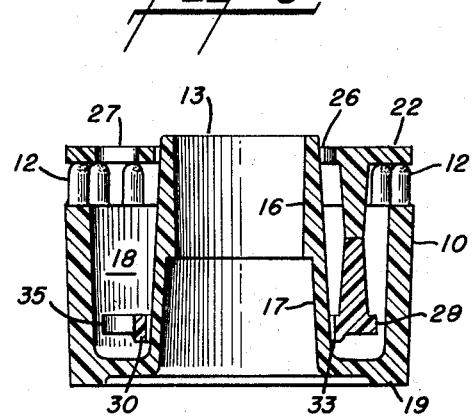
FIGURE 10 is a cross-sectional view taken along the line X—X of FIGURE 8.

The assembled flower holder is shown in FIGURES 8–10. FIGURE 8 being a top plan view, FIGURE 9 being a side elevational view and FIGURE 10 being a cross-sectional view taken along the line X—X of FIGURE 8. The upper plate 22, of the insert member, rests upon the integral pins 12, of the case 10, with the tubular portion 13 extending through the aligned central openings formed in the insert member. The lower plate 30, of the insert member, is spaced somewhat from the bottom wall of the chamber 18 and the tooth-like portions 28 are spaced slightly from the inner wall of the case which defines such chamber. Thus, these tooth-like members, together with the inner case wall, define a plurality of openings which are axially aligned with the openings 27 formed in the upper plate 22. One such opening, defined by the lower plate 30 and the case wall, is identified by the numeral 35 in the cross-sectional view of FIGURE 10. It will be apparent, therefore, that the stems of cut flowers may be inserted through the aligned openings 27 and 35 to rest upon the bottom of the case. Inasmuch as these aligned openings are spaced apart an appreciable distance, the flowers are retained substantially in a vertical position.

One set of aligned grooves 26 and 33, formed in the upper and lower plates 22 and 30, respectively, is visible in the cross-sectional view of FIGURE 10. Each set of aligned grooves is intended to accommodate a relatively stiff wire and, since the grooves are substantially closed by the outer wall of the tubular member 13, such wire will be retained in a vertical position.

Figure 4:
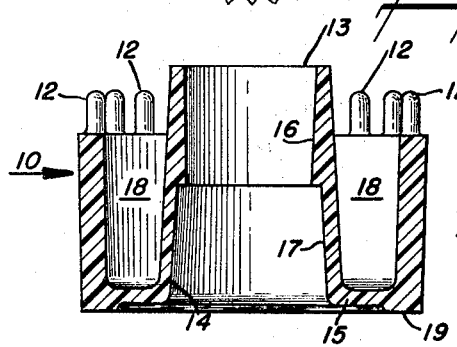
FIGURE 4 is a cros-sectional view taken along the lines IV—IV of FIGURE 1.
Figure 11:
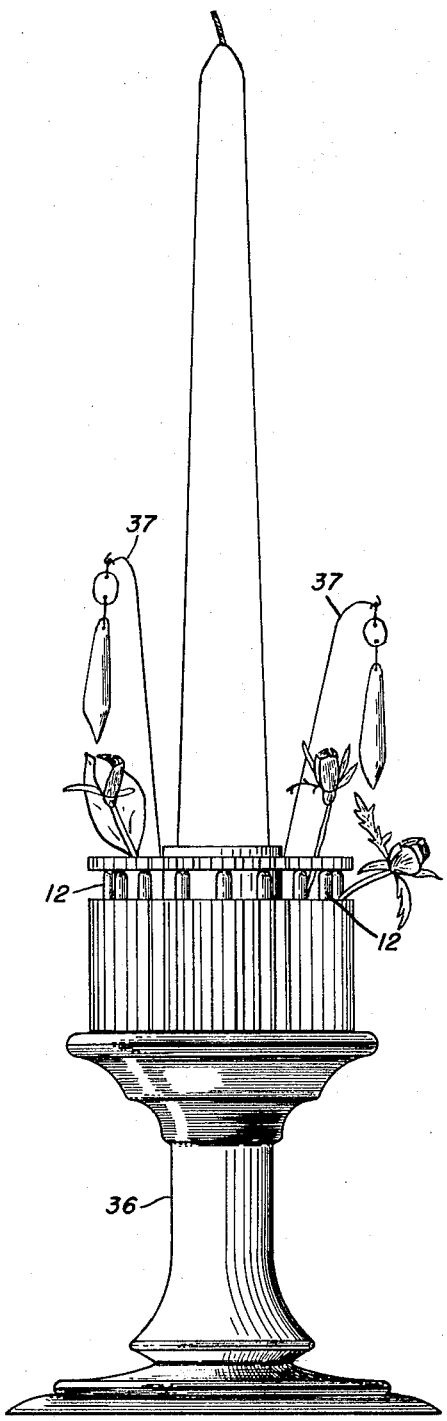
FIGURE 11 is a side elevational view showing the flower holder as used in combination with a candle carried by a conventional candle holder.

The described flower holder may serve as a holder for a candle, the lower portion of the candle being force-fitted into the tapered upper section 16 of the tubular member 13, see FIGURE 4. Alternatively, the flower holder may be used in combination with a candle carried by a conventional candle holder or a candlestick, as shown in FIGURE 11. In this case, the flower holder rests upon the candle hodler 36 with the candle passing loosely through the tubular portion of the flower holder. In either case, a plurality of flowers and greens can be inserted into the flower holder to provide a pleasing arrangement. In addition, a plurality of wires 37, supported in vertical position by the aligned grooves of the flower holder, may carry various small ornaments, thereby further enhancing the overall effect. Still further, additional hanging flowers, vines, etc., may have stems inserted into the water through the spaces between the pins 12, thereby to obscure as much of the holder as may be desired.

Although the illustrated flower holder is of a generally circular shape, it will be apparent that the novel features may be incorporated in other devices serving the same function but having different overall shapes. The two components of the flower holder may be made of similar-colored or different colored plastics, thereby to match or complement the color scheme of a particular table setting. Also, the outer surface of the case may have a configuration other than the parallel, pointed flute configuration herein specifically described.

Having now given a detailed description of the invention, those skilled in this art will be able to make various changes and modifications without thereby departing from the scope and spirit of the invention as recited in the following claims.

I claim:
1. A flower holder comprising,
  (a) an open case having a plurality of spaced pins extending upwardly from the open end thereof,
  (b) an insert member comprising an upper member supported by the said pins and a lower member spaced from the case bottom, and
  (c) means forming a plurality of axially aligned openings in said upper and lower members.
2. The invention as recited in claim 1, wherein the case and pins are an integral unit molded of a plastic.
3. The invention as recited in claim 1, wherein the inner wall of the tubular member comprises a tapered upper section.
4. The invention as recited in claim 1, wherein the outer surface of the case is formed of longitudinally-extending flutes and the peripheral surface of the said upper member is formed of matching flutes.
5. A flower holder comprising,
  (a) an open plastic case having spaced pins extending from the open end and a tubular member extending from the bottom to a point beyond said pins, said tubular member being open at each end,
  (b) an insert member comprising spaced upper and lower plates positioned over said tubular member with the upper plate supported by the said pins and the lower plate spaced from the case bottom, and
  (c) means forming aligned sets of openings in the two plates of the insert member.
6. The invention as recited in claim 5, including means forming aligned grooves in the two plates of the insert member, which grooves are spanned by the outer wall of said tubular member.
7. The invention as recited in claim 5, wherein the inner wall of said tubular member includes an upper tapered section joining a reversely-tapered lower section.
8. The invention as recited in claim 5, wherein the outer surface of the and the peripheral surface of said upper plate are formed of matching longitudinally-extending flutes.
9. A flower holder comprising,
  (a) an open plastic case having spaced pins extending from the open end and a central tubular member extending from the case bottom to a point beyond said pins, said tubular member being open at both ends.
  (b) plastic insert member comprising axially-spaced upper and lower plates positioned over the said tubular member, the upper of said plates resting upon said pins and the lower of said plates being spaced from the bottom of the case,
  (c) axially-aligned openings formed in said upper and lower plates, and
  (d) axially-aligned grooves formed in the said upper and lower plates, which grooves are spanned by the said tubular member.
10. The invention as recited in claim 9, wherein the outer wall of the case and the peripheral surface of said upper plate are formed of matching, longitudinally-extending flutes, and the inner wall of the said tubular member has a tapered upper section.
11. The invention as recited in claim 1, including an integral open tubular member extending upwardly from the base of the case, and wherein the said tubular member extends through aligned holes formed in the said insert member.

References Cited by the Examiner

UNITED STATES PATENTS

| D. 190,358 | 5/1961 | Scheuerlien. | |
| 1,989,952 | 2/1935 | Thomas | 47—41.13 |
| 2,191,511 | 2/1940 | Baff. | |
| 2,876,587 | 3/1959 | Saks et al. | 47—41.11 |
| 2,929,171 | 3/1960 | Josephson | 47—41.13 |

FOREIGN PATENTS

| 1,240,452 | 7/1960 | France. |

ABRAHAM G. STONE, *Primary Examiner.*

P. A. RAZZANO, *Assistant Examiner.*